Patented May 25, 1937

2,081,401

UNITED STATES PATENT OFFICE 2,081,401

PREPARATION OF FERTILIZER

Walter H. Kniskern, Prince George County, Va., and Charles K. Lawrence, Syracuse, N. Y., assignors, by mesne assignments, to The Solvay Process Company, New York, N. Y., a corporation of New York No Drawing. Application August 9, 1932, Serial No. 628,061

1 Claim. (Cl. 71—43)

This invention relates to compositions comprising ammonium chloride and ammonia, to processes for their production, to a method for the transportation of ammonium chloride and ammonia in the form of these new compositions, and to their use in the production of fertilizers.

Large amounts of nitrogen in the form of ammonia are commercially available from the several processes for the fixation of atmospheric nitrogen as ammonia. The ammonia thus obtained may be transported to the market in the form of aqua or anhydrous liquid ammonia or it may be reacted with acids to form the corresponding ammonium salts which are recovered as solids for shipment. The marketing of ammonia in the form of liquid anhydrous ammonia or of aqua ammonia is, however, attended by difficulties and expensive operations due to the high vapor pressures of liquid ammonia at ordinary temperatures and, with respect to aqua ammonia, to the cost of converting the liquid ammonia obtained from many synthetic processes into aqua ammonia and the transportation of the relatively large proportion of valueless water contained in the aqua ammonia. With respect to the recovery of solid ammonium salts such as ammonium chloride, for example, which may be produced by absorbing gaseous ammonia in aqueous hydrochloric acid, the recovery of solid dry ammonium chloride from the solutions thus obtained entails expensive evaporation of all of the water contained in the solutions, and drying the solid crystalline ammonium chloride which is recovered by separation from mother liquor from which it is crystallized.

It is frequently desirable to prepare fertilizers containing nitrogen as well as $P_2O_5$ derived from phosphate materials such as superphosphate. It has been been proposed to obtain such fertilizers by treating the superphosphate with ammonia. When the ammonia is added to the superphosphate, however, in relatively large amounts, it tends to cause water soluble and citrate soluble $P_2O_5$ in the superphosphate, both of which are considered available as plant food, to revert to a citrate insoluble form which is not considered available. There is, therefore, a limitation in the amount of ammonia which may be added to a superphosphate for the production of fertilizers containing nitrogen. For certain purposes, however, it is desirable to have a fertilizer containing more nitrogen than may be obtained by ammoniating a superphosphate without undue reversion of the $P_2O_5$.

It is, accordingly, an object of this invention to provide a composition of matter which comprises both ammonium chloride and ammonia, to provide processes for the economical production of these compositions and for the ready transportation of ammonia and ammonium chloride. Another object of the invention is to provide processes for the production of phosphate fertilizers containing a relatively high proportion of nitrogen by treating monocalcium acid phosphate materials, for example superphosphate, triple superphosphate or mixtures containing the same, with a liquid composition comprising ammonium chloride and ammonia.

Ammonium chloride dissolves in water to the extent of about 23 parts of ammonium chloride in 77 parts of water at 0° C. When ammonia is dissolved in the water the solubility of the ammonium chloride changes but little as the amount of ammonia is increased. Thus, at 0° C. a saturated solution of ammonium chloride in 25% aqua ammonia (a solution of ammonia in water containing 25% $NH_3$) contains about 25% ammonium chloride as compared with a saturated solution of ammonium chloride in water alone which contains at 0° C. about 23% ammonium chloride. We have discovered, however, that as the concentration of the aqua ammonia is increased above 50% aqua ammonia, the solubility of ammonium chloride rises relatively rapid to a maximum at about 90% aqua ammonia from which maximum the solubility again, and with increased rapidity, falls off as anhydrous liquid ammonia is approached. Thus, we have found that a solution of 90% ammonia and 10% water saturated with ammonium chloride at 0° C. contains about 50% ammonium chloride, and a solution of ammonium chloride in anhydrous liquid ammonia saturated at the same temperature contains about 39% ammonium chloride; i. e., an amount somewhat greater than that contained in a 50% aqua ammonia saturated at 0° C.

The peculiarity of an increasing solubility of ammonium chloride in concentrated aqua ammonia as the concentration of ammonia increases above about 50% is of practical importance in the production of fertilizers by the addition of such solutions to superphosphate materials. The relatively high solubility of ammonium chloride in concentrated aqua ammonia permits of using solutions substantially saturated with ammonium chloride at temperatures below about 30° C. to add to the superphosphate materials a relatively large amount of ammonium chloride without, at the same time, adding sufficient free ammonia to cause excessive reversion of $P_2O_5$. It is accordingly preferred to employ for the production of fertilizers in accordance with the process of this invention an aqueous composition containing ammonium chloride, ammonia and water of concentrations corresponding to solutions of ammonium chloride in aqua ammonia of 50% to 90% $NH_3$.

Solutions of ammonium chloride in either concentrated aqua ammonia or in anhydrous liquid ammonia serve as a convenient means for the transportation of ammonia and ammonium chloride particularly those solutions which have a salting out temperature below about 30° C. and more especially solutions which do not salt out at temperatures above about 0° C. The presence of the ammonium chloride lowers to a marked degree the vapor pressures of these solutions so that the containers used for their transportation need not be constructed to withstand as high pressures as are required for the transportation of concentrated aqua ammonia of corresponding strength or of liquid anhydrous ammonia. Thus, we have found that whereas anhydrous liquid ammonia has vapor pressures of 4.2 and 11.5 atmospheres absolute at temperatures of 0° C. and 30° C., respectively, a solution of ammonium chloride in liquid anhydrous ammonia containing about 42% ammonium chloride, which does not salt out at temperatures above about 2.4° C., has vapor pressures of 3.2 atmospheres absolute at 0° C. and 9.2 atmospheres absolute at 30° C. A solution of ammonium chloride in about 79% aqua ammonia containing about 46% ammonium chloride which does not salt out at temperatures above 0° C., has a vapor pressure of about 1.8 atmospheres absolute at 0° C. and 4.8 atmospheres absolute at 30° C., whereas an aqua ammonia of 79% $NH_3$ has a vapor pressure of 3.3 atmospheres absolute at 0° C. and 8.8 atmospheres absolute at 30° C. A 47% aqua ammonia has a vapor pressure at 0° C. of about 1 atmosphere absolute and at 30° C. of about 3.2 atmospheres absolute, whereas by dissolving ammonium chloride in an aqua ammonia of 47% $NH_3$ to obtain a solution containing about 31% ammonium chloride, the solution has a vapor pressure materially less than 1 atmosphere absolute at 0° C. and about 1.8 atmospheres absolute at 30° C. Such a solution does not salt out at temperatures above about 1° C.

The use of the compositions of this invention as a means for the transportation and storage of ammonium chloride and ammonia obviates the difficulty arising in the marketing of solid ammonium chloride because of the property the solid salt has of caking together when stored which necessistates a disintegration of the caked mass before it may be utilized for the production of fertilizers. The liquid ammonium chloride-ammonia containing compositions, on the other hand, may be readily utilized in the treatment of solid fertilizer materials containing superphosphate by mixing the liquid with the solid, for example, by spraying the liquid onto the solid material while it is being agitated in a mixing machine. As noted above, it is preferred to employ solutions which do not salt out at temperatures above about 0° C., since these solutions will not throw down a precipitate of solid material at ordinary temperatures or, if some preciptate should occur at extremely low temperatures such as may be met with in the winter time, the precipitated solid may be redissolved by a slight warming of the solution. Furthermore, while solutions of ammonium chloride in anhydrous liquid ammonia containing more than about 38% ammonium chloride may salt out at temperatures above about 0° C. and more concentrated solutions in anhydrous liquid ammonia may form solid masses at temperatures of about 0° C., the addition to such anhydrous solutions of relatively small amounts of water prevents this salting out of the solution. Thus, while a 52.6% solution of ammonium chloride and anhydrous liquid ammonia forms a completely solid mass at 0° C., if about 5% of water is added to such a composition, the material forms a solution which does not salt out at temperatures above about 0° C.

The solutions of this invention may be conveniently prepared, for example, by introducing ammonia as a gas or liquid anhydrous or concentrated aqua ammonia into a material containing ammonium chloride and water, for example, a solution or slurry of ammonium chloride, or by dissolving solid ammonium chloride containing more or less water in liquid ammonia or in aqua ammonia of suitable strength. These solutions may be particularly advantageously prepared from the liquid anhydrous ammonia or concentrated aqua ammonia liquors obtained from a synthetic ammonia process and the solutions of ammonium chloride obtained by absorbing ammonia in aqueous hydrochloric acid. If desired, gaseous or anhydrous liquid ammonia or concentrated aqua ammonia may be introduced into the solution of ammonium chloride thus obtained, or this ammonium chloride solution may be evaporated to drive off more or less of its water content before being treated with the ammonia. Again, the ammonium chloride solution may be concentrated to crystallize out solid ammonium chloride and the crystalline product filtered off and without a special drying treatment be dissolved in liquid ammonia or relatively concentrated solutions of ammonia in water. This invention, therefore, permits of producing ammonium chloride by absorbing ammonia in hydrochloric acid solution without necessitating a close control of the degree of neutralization of the solution in order to obtain a non-acid product such as is required where solid ammonium chloride is to be shipped to prevent destruction of the containers for the solid. Where the compositions of this invention are used for the transportation of the ammonium chloride, the solution in which the ammonia is absorbed may be operated with any desired degree of acidity and any free acid in the mother liquors adhering to the solid ammonium chloride is then neutralized by the ammonia used in making up the ammonium chloride-ammonia composition. Furthermore, a solution into which ammonia and hydrochloric acid are simultaneously introduced for reaction to form ammonium chloride may be operated with any desired degree of alkalinity without necessitating the removal of the free ammonia from the ammonium chloride product obtained. Or the ammonium chloride-ammonia-water solutions may be prepared directly by introducing gaseous or liquid anhydrous ammonia into aqueous hydrochloric acid in amount sufficient to neutralize the hydrochloric acid and to add the desired amount of free ammonia.

The following examples are illustrative of methods for the preparation of the ammonium chloride-ammonia compositions of this invention and their use in the production of fertilizers, but the invention is not limited to these examples or to the particular details described. The amounts of the various materials given in the examples are in parts by weight.

*Example I.*—A composition containing ammonium chloride, ammonia and water may be prepared by mixing 100 parts of liquid anhydrous ammonia with about 108 parts of solid ammonium chloride. This composition would salt out if cooled below about 10° C. and would completely solidify if cooled below about 8° C. To about 208 parts of the foregoing ammonium chloride-ammonia composition about 11 parts of water are added to form a composition which will not salt out at temperatures above about −4° C. At atmospheric temperatures this composition has a vapor pressure equivalent to that of about 60% aqua ammonia at corresponding temperatures.

A similar composition may be prepared by admixing about 108 parts of solid ammonium chloride with about 111 parts of 90% aqua ammonia or by dissolving about 119 parts of wet ammonium chloride containing about 11 parts of water in 100 parts of substantially anhydrous ammonia.

*Example II.*—An aqueous composition may be prepared by treating about 65.5 parts of an aqueous slurry of ammonium chloride containing about 31 parts of ammonium chloride with about 34.5 parts of substantially anhydrous ammonia which may be added as liquid anhydrous ammonia or may be absorbed in the slurry by introducing gaseous ammonia thereinto. A solution is obtained containing ammonium chloride, ammonia and water which does not salt out at temperatures above about 0° C. and has a vapor pressure at 30° C. of about 2.0 atmospheres absolute which is equal to the pressure of about 40% aqua ammonia.

A similar composition may be prepared by dissolving about 31 parts of ammonium chloride in 69 parts of about 50% aqua ammonia.

*Example III.*—An anhydrous solution is prepared by dissolving about 25 parts of dry solid ammonium chloride in about 40 parts of liquid anhydrous ammonia to obtain a composition which will not salt out at temperatures above about 0° C. The solution may be used in the preparation of a fertilizer by spraying about 65 parts of the solution onto a mixture containing the following ingredients:

| | Parts about |
|---|---|
| Superphosphate (18% $P_2O_5$) | 890 |
| Manure salts (containing the equivalent of 20% $K_2O$) | 400 |
| Ammonium sulfate | 193 |
| Inert filler (sand) | 452 |

The solution is sprayed onto this mixture while it is being agitated in a mixing device. The resulting fertilizer product is in good physical condition and contains about 4% N, 8% $P_2O_5$ and 4% $K_2O$.

*Example IV.*—About 34.5 parts of ammonium chloride are dissolved in about 80.5 parts of 50% aqua ammonia. About 115 parts of this solution are then sprayed onto a mixture containing the following ingredients:

| | Parts about |
|---|---|
| Superphosphate | 890 |
| Potassium sulfate | 160 |
| Ammonium sulfate | 181 |
| Inert filler (sand) | 654 |

The resulting product is in excellent physical condition and contains about 4% N, 8% $P_2O_5$ and 4% $K_2O$.

If desired, additional materials such as calcium nitrate, ammonium nitrate, ammonium sulfate, ammonium phosphate, urea, etc., or any two or more of these materials which in themselves are valuable fertilizers, may be incorporated with the ammonium chloride-ammonia solutions before they are added to the phosphate material, or, as in the case of Examples III and IV, they may be incorporated with the phosphate material before treatment with the ammonium chloride-ammonia solution. In preparing the fertilizers of this invention the several solid ingredients may, if desired, be introduced into a mixer and simultaneously admixed therein with the ammonium chloride-ammonia solution which is preferably supplied as a spray to the materials while they are being mixed. Further, if desired, a superphosphate material may be ammoniated with the ammonium chloride-ammonia solution and this ammoniated material be used as a fertilizer itself or it may be admixed with one or more additional fertilizer ingredients.

When in this specification and claim the phrase "saturated with ammonium chloride" at a given temperature is used, it is intended to refer to a solution of ammonium chloride from which a solid material containing ammonium chloride separates out from the solution when it is cooled to a lower temperature.

We claim:

A process for producing a fertilizer which comprises treating a superphosphate material with a solution of about 34.5 parts of ammonium chloride in about 80.5 parts of 50% aqua ammonia, said solution being added to the superphosphate material in the proportions of about 115 parts of the solution to about 890 parts of superphosphate.

WALTER H. KNISKERN.
CHARLES K. LAWRENCE.